United States Patent [19]

Sachdev et al.

[11] Patent Number: 4,617,579

[45] Date of Patent: Oct. 14, 1986

[54] HYDROPHILIC PROTECTIVE COATINGS FQR ELECTROEROSION PRINTING

[75] Inventors: Krishna G. Sachdev, Wappingers Falls; Ali Afzali-Ardakani, Katonah; Keith S. Pennington, Somers; Mitchell S. Cohen, Ossining, all of N.Y.

[73] Assignee: International Business Machines Corporation, Armonk, N.Y.

[21] Appl. No.: 597,148

[22] Filed: Apr. 5, 1984

[51] Int. Cl.[4] .............................................. G01D 15/06

[52] U.S. Cl. ................................. 346/135.1; 346/163; 101/462

[58] Field of Search ................ 346/76 PH, 76 R, 203, 346/135.1, 136, 162–164, 105; 101/465, 462, 457–459, 470; 400/120, 124

[56] References Cited

U.S. PATENT DOCUMENTS 3,831,179 8/1974 Brill et al. ........................... 346/162

4,134,341 1/1979 Weigele et al. ..................... 101/470

OTHER PUBLICATIONS

IBM Tech. Disc. Bulletin vol. 25, No. 7A Dec. 1982, pp. 3194–3195, Graphite-Resin Lamination on Thermal Ribbon by Findlay et al.

*Primary Examiner*—Arthur G. Evans

*Attorney, Agent, or Firm*—Jackson E. Stanland

[57] ABSTRACT

Electroerosion recording materials for "direct negative" and "offset master" are provided with a surface protective coating of solid conductive lubricant dispersed in a hydrophilic, crosslinked polymeric matrix. The protective films are especially useful where direct offset masters are produced without removal of noneroded lubricant film.

The recording medium of this invention provides use as a defect-free "direct negative" and/or "direct offset master", without requiring the removal of the overlayer prior to use on the printing press. The protective coatings are applied from aqueous dispersions of polymer-particulate compositions and thus avoiding the use of organic solvents.

24 Claims, 2 Drawing Figures

HYDROPHILIC PROTECTIVE COATINGS FOR ELECTROEROSION PRINTING

BACKGROUND OF THE INVENTION

The invention relates to electroerosion printing and to recording materials characterized by an improved hydrophilic, conductive or resistive lubricant topcoat, especially for use in the production of direct offset masters.

Electroerosion printing is a well-known technique for producing markings, such as, letters, numbers, symbols, patterns, such as, circuit patterns, or other legible or coded indicia on recording material in response to an electric signal which removes or erodes material from the surface of the recording material as the result of spark initiation.

The surface which is eroded or removed to provide such indicia on the recording material is usually a thin film of conductive material which is vaporized in response to localized heating associated with sparking (arcing) initiated by applying an electric current to an electrode in contact with the surface of a recording material comprising the thin conductive film on a flexible nonconductive backing or support. In the present state of the technology the thin conductive film is usually a thin film of vaporizable metal, such as, aluminum.

Electroerosion printing is effected by the movement of a stylus or a plurality of styli relative to the surface of specially prepared recording media. Electrical writing signals are fed to the stylus to provide controlled electrical pulses which generate sparks at the surface of the recording material to selectively heat and remove by evaporation a layer of the recording material; the locations from which material is removed correspond to the indicia or images which are to be recorded.

In the course of this process, the stylus is moved relatively to a surface of the recording material and in contact with the removable layer, e.g., a thin film of vaporizable material, usually a metal, such as aluminum.

Due to the fragility of the thin conductive layer and stylus pressure, considerable scratching (undesired removal of the removable layer) is observed to take place during electroerosion printing.

It has been recognized for some time, therefore, that the use of a lubricant and/or protective overcoat on the surface of such electroerosion recording materials would be helpful to reduce scratching by the stylus. After some investigation, lubricants comprising long chain fatty acids were adopted. Even with the use of such lubricants, however, some stylus scratching of the thin aluminum film of electroerosion recording materials continues to be observed. Therefore, efforts continued to be directed to finding a superior lubricant—protective layer composition for the surface of electroerosion recording materials.

In co-pending application Ser. No. 454,744 filed Dec. 30, 1982, entitled "Graphite Lubricant in Electroerosion Printing of Direct Offset Photonegative" and filed in the name of Mitchell S. Cohen, one of the co-inventors herein, the entire disclosure of which is incorporated herein by reference, there is described an improved electroerosion recording material having an overlayer of a protective lubricant composition comprising conductive particles of high lubricity dispersed in a polymeric binder on the stylus-contacting surface of the material. While various laminar solids and other soft compounds and soft metal particles are disclosed in Ser. No. 454,744 for use as the lubricant, conductive particles, graphite, due to its cost, effectiveness and easy dispersibility is the preferred material described therein.

When an electroerosion recording material is to be used as a direct offset master for printing with oleophilic inks, it is necessary to have hydrophobic-hydrophilic mapping of the image and non-image areas, respectively. With the electroerosion material of Ser. No. 454,744, after electroerosion printing, it is necessary to completely remove remaining topcoat to expose the hydrophilic surface of the conductive metal in the non-image areas in order to obtain the necessary differential in wetting characteristics. Either the support, such as Mylar®, or an intermediate layer of hydrophobic, hard, tackfree coating such as a coating of an organic polymer-silica dispersion, provides the hydrophobic, ink-receptive image areas after electroerosion recording. The removal of a lubricant topcoat in the preparation of an offset master is undesired as it presents an extra process step, usually requires use of an organic solvent which could affect or alter the other layers of the recording material and in general increases the chance of damage and/or delamination of the aluminum layer. Thus, it would be advantageous to provide an abrasion-resistant recording medium which does not require removal of the topcoat after electroerosion printing for use as an offset master.

U.S. Pat. No. 3,509,088 to Dalton describes electrical-signal-responsive films containing dispersed carbon black particles. In one embodiment, the carbon black particles are mono-layer coated with an adsorbate and then admixed with a multi-phase resin complex to form a film which can be applied over a conducting film.

U.S. Pat. No. 4,317,123 to Namiki et al is directed to a thermal recording material including a protective layer formed of film forming high molecular weight materials such as cellulose or derivatives thereof, etc. and which can contain various pigments and matting agents such as carbon black, colloidal silica, etc.

Among prior disclosures relevant to electroerosion printing, U.S. Pat. No. 2,983,220, Dalton et al, discloses a lithographic coating on an electroerosion recording sheet; the coating may be a copolymer binder system containing zinc oxide and zinc sulfide. An internal layer containing conductive material, such as graphite, is disclosed in U.S. Pat. No. 3,048,515, Dalton.

An electroresponsive recording blank having a removable masking layer containing a luminescent material is described in U.S. Pat. No. 2,554,017, Dalton. Other prior art providing further general background in the field of electroerosion printing includes U.S. Pat. Nos. 3,138,547, Clark and 3,411,948, Reis. High temperature lubricants comprising graphite in oil are also known, as is described in U.S. Pat. No. 3,242,075, Hunter.

SUMMARY OF THE INVENTION

It has been found that improved electroerosion recording materials, especially for use as a direct offset master, can be prepared by providing the aluminum surface of such materials with a protctive layer of solid conductive lubricant dispersed in a hydrophilic cross-linked polymer matrix.

The recording medium according to this invention provides use as a defect-free "direct negative" and/or "direct offset printing master" and thus has the advantage of process simplification by eliminating the need for removal of the overlayer after electroerosion recording and prior to use on the printing press as commonly practiced with conventional recording media. A further advantage of the unique protective coatings described herein is realized from application using aqueous dispersions of polymer-particulate compositions and thus avoiding the use of organic solvents.

The conductive solid lubricant may be selected from the various conductive particulate lubricants disclosed in Ser. No. 454,744.

In a preferred embodiment of the present invention, an aqueous coating dispersion is used with selection of particulate conductive lubricant, cross-linkable, hydrophilic binder resin and cross-linking agent which are compatible with an aqueous, i.e. water, water-ethanol mixtures, or water-miscible dispersing-coating solvent.

In the above embodiments, after coating, thermally induced solvent evaporation and curing is carried out to insolubilize the binder resin.

The overlayer disclosed herein can be applied directly to the surface of electroerosion recording materials.

One object of the invention, therefore, is to produce electroerosion recording materials of improved resistance to stylus scratching by use of the special lubricating coatings of this invention.

Another object is to provide an abrasion-resistant recording material suitable for generation of a high quality "direct negative" which also functions as a "direct offset printing master" with no extra step involved after electroerosion recording.

Another object of the invention is to provide a superior lubricant composition which can also exhibit improved contrast when used to produce direct-negatives by electroerosion printing. In such usage a dark graphite/polymer film serves to help block light that may be partially transmitted through the thin conductive film, e.g., a thin aluminum film. A further object of the present invention is to provide a lubricant composition which does not have to be removed in the production of offset masters.

Yet another object is to provide improved electroerosion recording material having a thin, uniform, and adherent overcoat for the aluminum film for protection against damage during storage and handling.

Another object is to provide an improved conductive or resistive protective overcoat for an electroerosion medium with a relatively low content of hydrophilic binder for dispersion of solid lubricant.

The materials incorporated in the recording materials of this invention also have the advantage of coating the recording styli with a light, fluffy, easily removable layer because of their high lubricity. This layer inhibits the build-up of organic residue layers which could cause "fouling" or "baking" of debris onto the styli which in turn prevents good writing.

Another advantage of the lubricating layers of this invention is that they are wetted by water, but not by oleophilic inks and thus do not have to be removed in the preparation of direct offset masters. Furthermore, the conductivity provided by the graphite appears to enhance the dielectric breakdown through the overlayer.

Further, the topcoat layer provides both protection to the recording sheet during handling and lubrication during the electroerosion process.

DETAILED DESCRIPTION OF THE INVENTION

Figure 1:
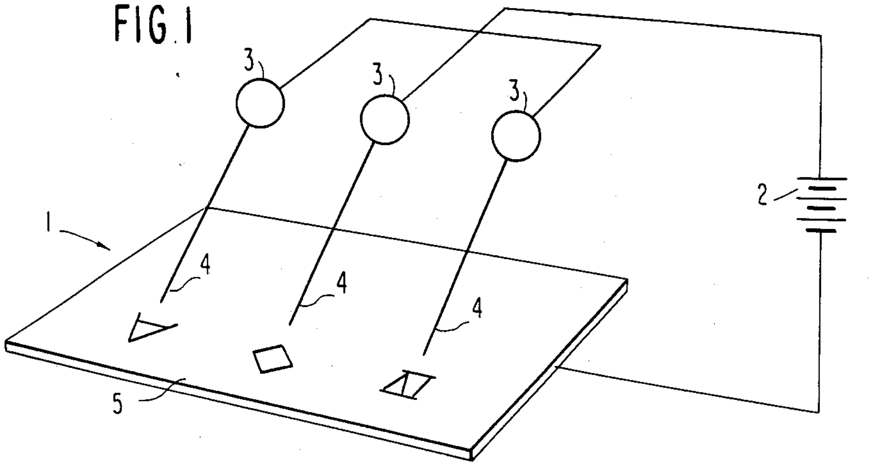
FIG. 1 of the drawings is a general schematic rendering of an illustrative electroerosion operation.

The present invention generally comprises electroerosion recording materials consisting of a flexible support preferably with an abrasion-resistant, ink-receptive layer of polymer-particulate compositions, and an electroerodible metal film such as Al with a protective coating comprising lubricating particles of good electric conductivity in special types of organic polymeric binders. Electroerosion materials for use as direct-negatives or direct masters can be prepared utilizing this invention. In general, the lubricating layer should have a density between about 2 and 30 micrograms per square centimeter since lower concentrations give inadequate lubrication and higher concentrations are too thick for good writing at low writing voltages (about 50 V) and short pulse lengths (about 3 microseconds). If more energy is applied by increasing the voltage of the writing pulse and increasing the pulse length, thicker films can be used. Also the lubricating agent binder ratio should be adjusted to avoid flake-off of the lubricating agent.

Many conductive laminar solids may be used as the particulate conductive lubricant agent for the protective layer. Preferred materials are concentrated aqueous colloidal suspension of graphite/purified carbon with average particle size less than 1 micron available from Superior Graphite Co., Acheson Colloid Co., or similar products from Graphite Product Corp. Other materials which are expected to be useful include, for example, carbon black of mean particle diameter 0.02$\mu$, solids such as Zno, $TiO_2$, $MoS_2$, $WS_2$, $VSe_2$, $TaSe_2$, CdS, $Sb_2O_3$ and $TaS_2$; other soft compounds such as AgI, PbO, $Pb(OH)_2$, MoO, $ZnI_2$, and $PbCo_3$; and soft metal particles such as Sn, Cu, Ag, Pb, Au, Bi, Zn, Al, etc.

Many film-forming, hydrophilic polymers are usable in the present invention as long as these are compatible with the particular solid lubricant selected and the particular dispersing-coating solvent system utilized.

As noted above, the preferred particulate lubricant is graphite. Dispersions of graphite in water-based systems, water miscible solvent systems and in aqueous-based solvent systems are available from commercial sources. For example, Superior Graphite Corp.'s product, DAG 191, contains, by weight, 16% graphite and 4% hydrophilic binder dispersed in aqueous solvent, which is compatible with many water dispersible cross-linkable hydrophilic polymeric binders, and also Acheson Colloid Co. distributes AQUA DAG materials which are compatible with many aqueous solvent dispersible cross-linkable hydrophilic polymeric binders. In both cases, the hydrophilic polymeric binders are cross-linkable to form water-wettable, flake-off resistant films. Similar graphite products are available from Graphite Products Corp.

The topcoats of the present invention are characterized by hydrophilicity, conductivity, wear resistance, thermal stability, abrasion resistance and excellent adhesion to the surface of the metal conductive layer such as an aluminum surface.

A typical structure comprises a flexible support such as polyethylene terephthalate (Mylar ®) with an abrasion-resistant base layer of polymer-particulate matrix which is preferably cross-linked, a thin conductive electroerodible film such as Al and a protective overlayer consisting of solid lubricants dispersed in a hydrophobic polymer matrix.

As discussed above, once the concept of the present invention is understood and appreciated, many polymeric binders which are hydrophilic and cross-linkable into flake-off and smudge resistant films will be apparent to the skilled artisan for use herein or can be determined through routine experimentation. The cross-linking agents appropriate for use with selected polymers are also known in the art. Usually, curing is carried out by including a chemical cross-linker in the coating formulation which is largely inactive until activated through energy input, for example by raising the temperature of the coated layer to a curing temperature which is higher than the temperature under which coating is accomplished.

According to this invention, the protective coatings are preferably cast from aqueous dispersions of conductive particulate material in hydrophilic water-soluble binders having free reactive groups including hydroxyl, carboxyl, hydroxyethyl, hydroxypropyl, amino, aminoethyl, aminopropyl, carboxymethyl, etc., along with preferred cross-linking or modifying agents including hydrophilic organotitanium reagents, aluminoformyl acetate, dimethylol urea, melamines, etc.

Useful hydrophilic polymers are, for example, cellulosic polymers such as hydroxyethyl cellulose, hydroxypropyl cellulose, aminoethyl cellulose, carboxy methyl cellulose, aminopropyl cellulose and methyl cellulose, hydroxyethylene polymers, polyethylene glycols, hydroxypropylene polymers, polyvinyl alcohol, etc., that can be used and will remain hydrophilic, but water-resistant in the cross-linked condition. As discussed, compatible cross-linking agents are selected to convert the hydrophilic polymer into a flake-off resistant preferably water-insoluble film which retains the hydrophilic characteristics of the precursor polymeric binder. Suitable cross-linking agents for many of the cellulosics are titanium esters such as titanium tetrapropoxide, tetrabutyl titanate and higher titanate esters, but preferably titanium organo chelates for use in water-based coatings, for example, titanium lactic acid chelate, titanium acetyl acetonate, titanium triethanolamine chelate, etc., which are available from E. I. du Pont de Nemours & Co., Inc., Pigment Department, under the trade name "TYZOR" Organic Titanates, are used. The latter appears to be very hydrolytically stable. Other useful titanium reagents include titanium di(cumylphenylate) oxyacetate, isopropyltridodecylbenzene sulfonyl titanate, titanium di(dioctylpyrophosphate) oxyacetate, various Titanium Quats and related reagents as available from Kenrich Petrochemicals, Inc., under the trade name "Ken-React", aluminoformylacetate for cross-linking of carboxymethyl cellulose and related binders, dimethylol urea and melamines.

With aqueous coating compositions, such as those based on AQUA-DAG, various water-dispersible film-forming polymeric binders cross-linkable into hydrophilic, water-resistant films can be employed, for example, aqueous dispersions of the aforementioned polymers. The skilled artisan can readily select an appropriate chemical cross-linking agent for use with a specific type of water-dispersible polymeric binder, such as the aforementioned titanium organochelates, urea, dimethylol urea, melamines, etc.

Where desired, various dispersants, surfactants, wetting agents, etc, can be employed to aid in forming a good dispersion which allows application of a uniform coating of particulate lubricant throughout the polymeric binder to the metal conductor layer. Suitable materials of this type are polyols. With titanium reagents, especially Titanium Quats, no wetting agents are necessary.

It is found that a wide range of binder concentrations can be effectively used, e.g., the weight ratio of pigment:total binder is in the range of 8:2 to 1:1, respectively.

An advantage of higher binder content is that there is less tendency of the overlayer to smudge or flake off during handling. It is estimated that about 30% binder and above is satisfactory for this purpose.

It may be noted that in the case of too high binder content, e.g., over about 80%, there may be danger of stylus fouling from the debris. Therefore, the binder chemistry must be chosen with care; binders with high glass transition temperatures are better in that regard.

The percent cross-linking agent based on organic solids is typically between 5–25% in the case of titanate coupling agents. The protective coatings described herein preferably have a dry density in the range of 2–15 micrograms/square centimeter which is low enough to avoid any possibility of undesired accumulation of eroded debris on the print head during recording, but sufficient to provide adequate lubrication and protection of the conductive layer.

The detailed description of the invention can be better appreciated by reference to the accompanying drawings. FIG. 1 illustrates schematically an electroerosion printing system 1 which includes a source of electrical energy 2, which is connected with writing control means 3 for controlling the flow (voltage and pulse length) of electrical current to styli 4 which are electrodes which contact the surface of the electroerosion recording material 5.

In operation, electric current pulses corresponding to information to be printed on the recording material 5 are transmitted through the writing control systems 3 to the styli 4. As a result, electrical discharges are generated at the surface of the recording material 5, and the temperature of the thin surface film is locally raised causing evaporation of the surface film or layer and the underlying material is exposed to produce the desired image.

Means (not shown) are provided for moving the styli 4 relative to and in contact with the surface of the recording material 5. As the styli 4 move relative to the recording material 5 and the writing control means 3 direct pulses of current to the styli of sufficient voltage to cause arcing and evaporation of a conductive layer of the material, there can be recorded desired information, patterns and graphics of any kind. It is during the movement of the styli over and in contact with the surface of the recording material that the thin film on the surface of the recording material is liable to be scratched and abraded resulting in poor writing quality and perhaps the recording of erroneous information.

Figure 2:
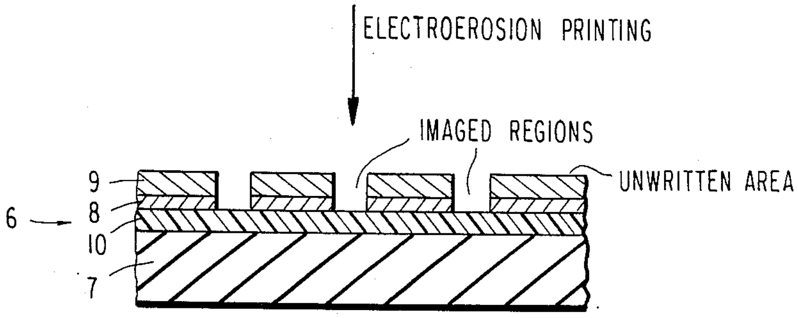
FIG. 2 of the drawings is a cross-sectional view of a direct offset master made in accordance with the invention and showing the removal of surface layers in regions where electroerosion has been effected.

Referring to FIG. 2, the electroerosion recording material of this invention 6 is shown in cross-section to comprise a support 7 of paper, polymer film, etc., a thin, conductive, evaporable layer or film 8, and a lubricant layer or film 9; optionally a tough, hard, transparent film 10 may be positioned between the support 7 and the evaporable layer 8. This intermediate film 10 preferably is of a layer of small hard particles in a suitable polymeric binder, *for example, silica particles in a cellulose*-acetate-butyrate (CAB) polymeric binder, or as disclosed in copening application, Ser. No. 454,743, filed Dec. 30, 1982, (the entire disclosure of which is expressly incorporated by reference), silica particles in a cross-linked polymer such as urethane cross-linked CAB, which may be light transmissive or transparent, to further reduce scratching of the material during electroerosion printing. The evaporable film 8 usually has a resistance from about 1 to 5 ohms per square and is frequently a vapor-deposited thin film of aluminum.

Where the backing or support is a light transparent or transmissive material, the resulting product can be used as a photomask or directnegative medium for the development of photosensitive materials, e.g., in the production of offset lithography masters, circuit boards, etc.

The recording material is preferably to be used as an offset master where the support is chosen to be an ink receptive material such as polyester. After imaging by electroerosion printing to expose the support layer selectively, the overlayer lubricating composition does not have to be removed, as illustrated by FIG. 2.

Electroerosion recording materials of the invention may be prepared in accordance with the following procedure:

As a support, a flexible sheet of Mylar ® polyester 50 micrometers thick was provided. On this support, using conventional web-coating apparatus, a coating of silica particles in a urethane cross-linked CAB binder was put down, as is described in the aforementioned co-pending U.S. patent application Ser. No. 454,743. Onto this layer there was evaporation deposited, by conventional technique, a thin conductive film of aluminum, about 400 Å thick. This type of structure was used in the Examples hereinbelow, onto which the protective lubricating films were coated.

In each example, to form the protective overlayers, the ingredients were combined and mixed using a high speed stirrer to form a homogeneous dispersion which was subsequently diluted with water followed by the addition of cross-linking agent prior to coating application using a conventional web coating apparatus, followed by solvent evaporation/curing at 100°-110° C. for 5 to 10 minutes, unless otherwise stated.

The following working examples are described to illustrate the best mode of carrying out this invention to provide an improved recording medium and generation of a "direct offset master" and/or a "direct negative". A unique feature of this material is provided by the lubricant overlayer on the aluminum surface which is effective in preventing mechanical abrasion of the conductive film during electroerosion recording and which need not be removed prior to use of the material as an offset printing master.

EXAMPLE 1

A 5% (w/v) aqueous solution of hydroxyethylcellulose (mw 50,000), 45.5 parts by weight was combined with 10.0 parts of a 16% graphite dispersion in water (Dag 191 from Acheson Colloid Co.) and the mixture was vigorously stirred for 30 minutes, thinned with 50 parts of water, and combined with 1.5 parts of titanium lactic acid chelate as a 5% solution in water (TYZOR LA, available from Dupont), prior to coating application onto the Al surface to form a hydrophilic protective layer at a dry density between 5-10 micrograms/cm$^2$. When employed as printing material using an electroerosion device at 30-60 volts, there was provided *an excellent quality "direct negative" which was* employed directly on the printing press as an "offset printing master". The imaged area was found to be ink receptive while the unwritten area was non-receptive to oil-based inks.

Similar protection coatings with higher organic binder content are formed by increasing the amount of hydroxyethylcellulose solution in the above composition. Also, other cellulose derivatives including hydroxypropyl-, aminoethyl-, and aminopropylcellulose were employed as binders in place of hydroxyethylcellulose to provide coating formulations for the protective layer according to this invention. Other commercially available graphite formulations, such as the concentrated colloidal suspension of purified carbon/graphite in water (No. 150) from Superior Graphite Co., work as well.

EXAMPLE 2

A 2% (w/v) aqueous solution of polyvinyl alcohol (~50,000 medium mw, 99% hydrolysed), 100 parts by weight, was combined with 45.0 parts of a 15% (w/w) graphite dispersion in water and the mixture was stirred for 1-2 hours, diluted with water, followed by the addition of 0.3 parts of titanate Quat formed by combining Titanium di(dioctylpyrophosphate)oxyacetate (KR 138, from Kenrich Petrochemicals) and 2-dimethylaminomethylpropanol. The mixture is shaken on a high speed shear mixer for 1-2 minutes to provide a homogenous composition which is applied on the aluminized substrate as in Example 1.

EXAMPLE 3

A 2% (w/v) aqueous solution of carboxymethylcellulose (CMC), 5.0 parts by weight was combined with 1.3 parts of aqueous graphite dispersion (Dag 191 from Acheson Colloid Co.) and stirred for 2-4 hours to form a uniform dispersion. Prior to coating application, the formulation was prepared by addition of 0.03 parts of aluminoformylacetate and 15 parts of deionized water to this dispersion and thoroughly mixing the ingredients on a paint shaker for 10-15 minutes.

EXAMPLE 4

10 grams of a 4% by weight hydroxypropyl cellulose (300,000 molecular weight) solution in 1:1 isopropanol:-tetrahydrofuran was combined with 10 grams of Acheson ELECTRO-DAG 154 and 30 grams additional 1:1 isopropanol:tetrahydrofuran solvent. After thorough mixing, 0.2 grams of titanium chelate (titanium acetylacetonate as 75% solution in IPA) was added to the mixture. This coating solution was then applied to the above-described aluminized support by spin coating and then curing was carried out at 100° C. for 30 minutes to yield a lubricant topcoat of about 24 $\mu$m/cm$^2$ thickness. The contact angle of water was found to be 35° and the film was resistant to water, although being hydrophilic.

EXAMPLE 5

100 grams of a 5% by weight solution of polyvinyl alcohol of molecular weight 2,000 in a 4:1 water:ethanol mixture was combined with 25 grams of Acheson AQUA-DAG and 0.3 grams of polyol (Pluronic L62 avaialble from BASF) and ball-milled for 16 hours. A coating formulation was prepared by thoroughly mxing 10 grams of this dispersion with 1 gram of 10% solution of titanium acetylacetonate in 4:1 water/ethanol. This mixture was spin applied to the aluminized sample. Thermal curing was carried out at 100° C. for 15 to 20 minutes to provide a coating film which was water-resistant, abrasion resistant and hydrophilic, having a water contact angle of between 20°-30°.

The electroerosion recording materials of Examples 1 and 3 can be used to provide good, long-running offset masters without requiring removal of the lubricant topcoat.

As discussed above, the solvent for the lubricating material-cross-linkable binder is not critical, as long as all materials are compatible from the standpoint of good dispersibility. With the preferred titanium chelate cross-linkers, it has been found that at this time optimum results are obtained when the proportion of the titanium chelate is between 15 to 25% by weight based on the binder. Similarly, optimum results appear to be attainable where the total binder content of the graphite or other conductive material containing dispersion is suggested to be between 30 to 60%.

The water resistance of water insolubility of the cured film can be strengthened by an after-treatment of the film surface with a solvent solution of the same or similar cross-linking agent used in the original dispersion, with the solvent being selected to thoroughly wet and preferably penetrate into the surface of the cured film. For example, the material of Example 4 can be further treated with a 5% isopropanol solution of triethanolamine titanium chelate followed by cure.

Another preferred embodiment of the present invention involves the addition of hydrophilic fillers such as colloidal silica to the lubricant topcoat in order to improve the wetting characteristics of the hydrophilic overcoat.

While this invention has been described in connection with specific embodiments, it will be understood that those of skill in the art may be able to develop variations of the disclosed embodiments without departing from the spirit of the invention or the scope of the following claims.

We claim:

1. Electroerosion recording material comprising:

a non-conductive support member, a thin conductive member on said support member, said conductive member being evaporable in response to being heated in an electroerosion recording process, and an overlayer of protective lubricant composition on the stylus-contacting surface of said material, said lubricant composition comprising conductive particles of high lubricity dispersed in a hydrophilic cross-linked polymeric binder, the ratio of binder to lubricant particles in said overlayer being sufficient substantially to prevent flake-off during handling and use of said material.

2. The material of claim 1, wherein said binder is a water-dispersible hydrophilic polymer selected from the group consisting of cellulosic polymers, hydroxyethylene polymers, polyethylene glycols, hydroxypropylene polymers and polyvinyl alcohols.

3. The material of claim 1 or claim 2, wherein the amount of binder in said overlayer is from 20% to 50% by weight of said overlayer, the balance essentially being solid lubricating particles.

4. The material of claim 1 or claim 2 wherein the conductive particles are graphite.

5. The material of claim 1 or claim 2 wherein the support is a hydrophobic polymer such that, after electroerosion of the conductive member, the material may be utilized in direct offset master applications.

6. The material of claim 4 wherein the support is a hydrophobic polymer such that, after electroerosion of the conductive member, the material may be utilized in direct offset master applications.

7. The material of claim 1, wherein said polymeric binder has been cross-linked through the use of a chemical cross-linking agent.

8. The material of claim 7, wherein said chemical cross-linking agent is selected from titanium esters and titanium organochelates.

9. The material of claim 1 or claim 2, further comprising a thin, hard layer of cross-linked polymer between said support and said conductive member, said layer serving to increase the resistance to scratching of said member during electroerosion recording.

10. The material of claim 4, further comprising a thin, hard layer of cross-linked polymer between said support and said conductive member, said layer serving to increase the resistance to scratching of said member during electroerosion recording.

11. The material of claim 5, further comprising a thin, hard layer of cross-linked polymer between said support and said conductive member, said layer serving to increase the resistance to scratching of said member during electroerosion recording.

12. The material of claim 9, wherein said layer between said support and said conductive member is filled with silica particles.

13. An electroerosion recording medium, comprising a nonconductive support member, a thin conductive layer that is erodible in response to being heated in an electroerosion recording process wherein electrical current flows from a stylus that contacts said recording medium, and an overlayer on the stylus-contacted side of said thin conductive layer, said overlayer being a protective lubricant layer comprised of solid lubricant particles dispersed in a hydrophilic polymeric binder where said polymeric binder is a cellulose polymer.

14. The recording medium of claim 13, where said cellulose polymer is hydroxyethyl cellulose.

15. The recording medium of claim 14, where said solid lubricant particles are graphite.

16. The recording medium of claim 13, where said polymeric binder is cross-linked.

17. The recording medium of claim 13, where said solid lubricant particles are graphite.

18. The recording medium of claim 13, where said polymeric binder is water-dispersible.

19. An electroerosion recording medium, comprising:

a nonconductive support member, a thin conductive layer that is erodible in response to being heated in an electroerosion recording process wherein electrical current flows from a stylus that contacts said recording medium, and an overlayer on the stylus-contacted side of said thin conductive layer, said overlayer being a protective lubricant layer comprised of said lubricant particles dispersed in a hydrophilic polymeric binder where said hydrophilic polymeric binder is a polymer having free reactive carboxyl groups therein.

20. The recording medium of claim 19, where said polymeric binder is cross-linked.

21. The recording medium of claim 20, where said solid lubricant particles include graphite.

22. The recording medium of claim 19, where said solid lubricant particles include graphite.

23. An electroerosion recording medium, comprising:

a nonconductive support member, a thin conductive layer that is erodible in response to being heated in an electroerosion recording process wherein electrical current flows from a stylus that contacts said recording medium, and an overlayer on the stylus-contacting side of said thin conductive layer, said overlayer being a protective lubricant layer comprised of solid lubricant particles dispersed in a cross-linkable hydrophilic polymeric binder where said overlayer is cast from an aqueous dispersion of said solid lubricant particles in said hydrophilic polymeric binder, said binder being watersoluble.

24. The recording medium of claim 23, where said thin conductive layer is Al.

* * * * *